No. 780,048. PATENTED JAN. 17, 1905.
P. M. LINCOLN.
SINGLE PHASE ALTERNATING CURRENT SYSTEM OF DISTRIBUTION.
APPLICATION FILED MAY 3, 1904.
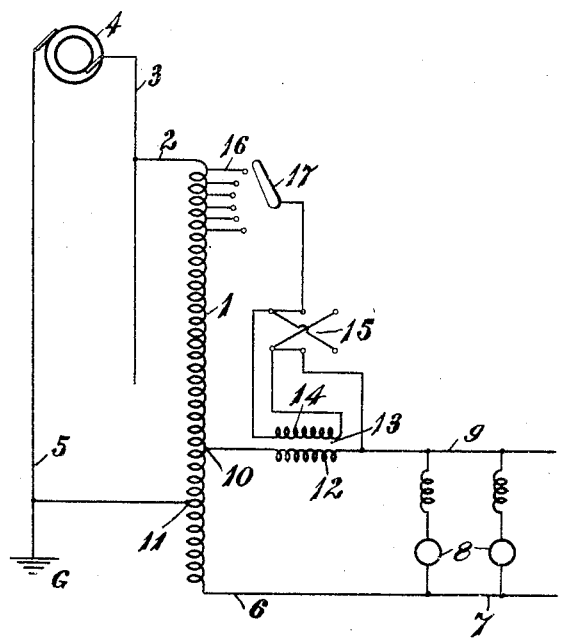
WITNESSES:
C. L. Belcher
Otto S. Schairer
INVENTOR
Paul M. Lincoln
BY
Wesley G. Carr
ATTORNEY No. 780,048.

Patented January 17, 1905.

UNITED STATES PATENT OFFICE.

PAUL M. LINCOLN, OF PITTSBURG, PENNSYLVANIA, ASSIGNOR TO WESTINGHOUSE ELECTRIC & MANUFACTURING COMPANY, A CORPORATION OF PENNSYLVANIA.

SINGLE-PHASE ALTERNATING-CURRENT SYSTEM OF DISTRIBUTION.

SPECIFICATION forming part of Letters Patent No. 780,048, dated January 17, 1905.

Application filed May 3, 1904. Serial No. 206,187.

*To all whom it may concern:*

Be it known that I, PAUL M. LINCOLN, a citizen of the United States, and a resident of Pittsburg, in the county of Allegheny and State of Pennsylvania, have invented a new and useful Improvement in a Single-Phase Alternating-Current System of Distribution, of which the following is a specification.

My invention relates to systems of distribution for single-phase alternating-current energy; and it has for its object to provide a system in which energy may be transmitted at high voltages and delivered through voltage-regulating apparatus to translating devices at lower voltages and in which the differences of potential between the grounded conductor from the source of energy and the respective terminals of the translating devices are reduced to safe and limited values.

It has been proposed to operate by means of alternating-current energy motors of the commutator type of construction having series-connected armature and field-magnet windings, such motors being similar in many respects to ordinary direct-current motors, and various systems have been devised for transmitting energy at high voltages and supplying it at variable low voltages to motors at the points of consumption. In one system for this purpose with which I am acquainted the difference of potential between one terminal of the motors and the grounded conductor is the same as the potential difference between the motor-terminals, whereas in the system comprising my present invention the differences of potential between the respective motor-terminals and the grounded conductor are only one-half that between the motor-terminals. With this arrangement the stresses on the insulation and the dangers incident to the operation or repair of the motors are materially reduced.

In the accompanying drawing the single figure is a diagrammatic view of a system of distribution embodying my invention.

My system comprises a main transformer-winding 1, having one end terminal 2 connected, by means of a conductor 3, to one terminal of an alternating-current generator 4, the other terminal of which is shown as connected to ground by means of a conductor 5. The other end terminal 6 of the transformer 1 is connected to one conductor 7 of the circuit for supplying the motors 8, the other conductor 9 of the motor-circuit being connected to a point 10 in the winding 1 which will insure the desired difference of potential between the motor-terminals. A point 11 in the winding 1 between the points 6 and 10 is connected to the grounded conductor 5. If the system is employed for the operation of railway-motors, the conductor 5 might be the track or the grounded portion of the circuit.

The conductor 9 of the motor-circuit includes the secondary winding 12 of a series transformer 13. The terminals of the primary winding 14 of the series transformer 13 may be respectively and reversibly connected to the terminal of the secondary winding 12 that is adjacent to the motors 8 and to a desired point in the main transformer-winding 1 by means of a reversing-switch 15. The transformer-winding 1 may be provided with a number of spaced leads 16, and a switch-arm 17 be employed in connection therewith to vary the point of connection of the winding 14 with the winding 1.

It is to be understood that the voltage-regulating apparatus may be varied considerably from what is herein shown and described, since it forms no part of my present invention except in the sense and to the extent that it constitutes a desirable and useful feature of the system as a whole.

In order to reduce the potential difference between the terminals of the motors 8 and the grounded conductor 5 to approximately one-half the maximum difference of potential between the terminals of the motors, the point 11 in the main transformer-winding 1, which is connected with the conductor 5, will generally be located somewhat nearer the point 10, to which the secondary winding 12 of the seires transformer 13 is connected, than to the terminal 6, though it is obviously practicable to vary the location of the point 11 from what is shown in the drawing without forfeiting the substantial advantages of the invention. The point 10 is so chosen that when the voltage in the winding 12 is added to the voltage supplied to the motors by the portion of the main transformer-winding 1 between the terminal 6 and the point 10 the full potential is supplied to the motors 8, and so that when the current in the winding 12 is subtracted from that supplied by the portion of the winding between the terminal 6 and the point 10 of the main transformer-winding 1 the lowest starting voltage is supplied to the motors 8.

While I have shown two motors connected in parallel between the conductors 7 and 9, it would of course be feasible to employ a single translating device only or several translating devices, whether motors or other electrical apparatus, and to connect them either in series or in parallel, as might be desired.

I claim as my invention—

1. The combination with one or more translating devices and a source of alternating-current energy of higher voltage than that supplied to the said devices, of a transformer-winding having one end terminal and an intermediate point connected to said source and having its other end terminal and another intermediate point respectively connected to the terminals of the translating devices, and means for regulating the voltage supplied to said translating devices.

2. The combination with a source of alternating-current energy and a transformer-winding having one terminal and a point intermediate its terminals respectively connected to said source, of one or more translating devices the terminals of which are respectively connected to the other terminal of said transformer-winding and to a point intermediate its terminals, and means for regulating the voltage supplied to said devices.

3. The combination with a source of alternating-current energy and a transformer-winding having one terminal and an intermediate point respectively connected to said source, of one or more translating devices the terminals of which are respectively connected to the other terminal of said transformer-winding and to an intermediate point therein which is more remote from said last-named terminal than the intermediate connection thereof with the source of energy.

4. The combination with a source of alternating-current energy and a transformer-winding having one terminal and an intermediate point respectively connected to said source, of one or more translating devices the terminals of which are respectively connected to the other terminal of said transformer-winding and to an intermediate point therein which is approximately the same distance from the intermediate connection with the source of energy as said connection is from the terminal of the transformer-winding which is connected to the translating devices.

5. The combination with a source of alternating-current energy and a transformer-winding having one terminal and an intermediate point respectively connected to said source, of one or more translating devices the terminals of which are respectively connected to the other terminal of said transformer-winding and to an intermediate point therein the distance of which from the last-named terminal of the transformer-winding is approximately double that of the point having intermediate connection with the source of energy.

6. The combination with a source of alternating-current energy and a transformer-winding having one terminal and an intermediate point respectively connected to said source, of one or more translating devices the terminals of which are respectively connected to the other terminal of said transformer-winding and to an intermediate point therein such that the point of connection of the source of energy with the transformer-winding which is intermediate its terminals lies between the points of connection of said winding with the translating devices.

7. The combination with a source of alternating-current energy and a transformer-winding having one terminal and an intermediate point respectively connected to said source, of one or more translating devices the terminals of which are respectively connected to the other terminal of said transformer-winding and to an intermediate point therein such that the point of connection of the source with the transformer-winding which is intermediate its terminals lies approximately midway between the terminal connections of the translating devices therewith.

8. The combination with a source of alternating-current energy and a transformer-winding having one terminal and an intermediate point respectively connected to said source, of one or more translating devices the terminals of which are respectively connected to the other terminal of said transformer-winding and to an intermediate point therein such that the difference of potential between the terminals of the said devices shall be approximately double that between the terminal of the transformer-winding which is connected to the said devices and the intermediate point of connection with the source of energy.

9. The combination with a source of alternating-current energy and a transformer-winding having one terminal and an intermediate point respectively connected to said source, of one or more translating devices the terminals of which are respectively connected to the other terminal of said transformer-winding and to an intermediate point therein such that the differences of potential between the respective terminals of the said devices and the intermediate connection in the transformer-winding shall be less than that between the terminals of the said devices.

10. The combination with a source of supply of alternating-current energy and a main transformer-winding having one terminal and a point intermediate its terminals respectively connected to said source, of one or more motors having a terminal or terminals connected to the free terminal of the main transformer-winding, and voltage-regulating apparatus comprising primary and secondary windings in inductive relation to each other, the latter of which is connected between the other terminal or terminals of said motor or motors and a point in the main transformer-winding and the former of which connects the said last-named motor terminal or terminals to another point of the main transformer-winding.

In testimony whereof I have hereunto subscribed my name this 12th day of April, 1904.

PAUL M. LINCOLN.

Witnesses:
   J. C. MORSE,
   BIRNEY HINES.